(12) United States Patent
Bisht (10) Patent No.: US 8,344,851 B2
(45) Date of Patent: Jan. 1, 2013

(54) METHOD FOR PROVIDING REMOTE MOBILE DEVICE ACCESS AND CONTROL

(75) Inventor: Man Mohan Singh Bisht, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 1615 days.

(21) Appl. No.: 11/807,977

(22) Filed: May 31, 2007

(65) Prior Publication Data

US 2007/0293194 A1 Dec. 20, 2007

(30) Foreign Application Priority Data

May 31, 2006 (IN) .............................. 936/CHE/2006
May 16, 2007 (KR) .................................. 2007/47797

(51) Int. Cl.
*H04Q 9/00* (2006.01)
(52) U.S. Cl. .................... 340/5.85; 379/142.05; 455/411
(58) Field of Classification Search ................. 340/5.85, 340/539.1, 539.14, 3.1, 5.1, 825.52; 455/411; 379/142.05
See application file for complete search history.

(56) References Cited

U.S. PATENT DOCUMENTS

| | | | | |
|---|---|---|---|---|
| 5,510,777 A * | 4/1996 | Pilc et al. ...................... 340/5.27 |
| 6,400,265 B1 * | 6/2002 | Saylor et al. ................... 340/531 |
| 6,496,936 B1 * | 12/2002 | French et al. ...................... 726/7 |
| 6,967,947 B1 * | 11/2005 | Chen et al. ..................... 370/353 |
| 6,990,588 B1 * | 1/2006 | Yasukura ....................... 713/186 |
| 7,117,051 B2 * | 10/2006 | Landry et al. .................... 700/83 |
| 7,143,436 B2 * | 11/2006 | Yamaguchi et al. ............... 726/6 |
| 7,164,666 B2 * | 1/2007 | Bunn et al. ..................... 370/329 |
| 7,260,221 B1 * | 8/2007 | Atsmon ........................ 380/247 |
| 7,316,030 B2 * | 1/2008 | Audebert et al. ............... 726/14 |
| 7,469,291 B2 * | 12/2008 | Hammell et al. ............... 709/225 |
| 7,594,114 B2 * | 9/2009 | Hooker et al. ................ 713/170 |
| 7,634,263 B2 * | 12/2009 | Louch et al. ................... 455/420 |
| 7,676,034 B1 * | 3/2010 | Wu et al. ................... 379/265.01 |
| 7,693,976 B2 * | 4/2010 | Perry et al. .................... 709/223 |
| 7,769,591 B2 * | 8/2010 | White et al. ................... 704/270 |
| 2002/0004720 A1 * | 1/2002 | Janoska ........................ 704/270 |
| 2004/0143767 A1 * | 7/2004 | Schreiber et al. ............. 713/202 |
| 2004/0164848 A1 * | 8/2004 | Hwang et al. ................. 340/5.82 |
| 2005/0035854 A1 * | 2/2005 | Gupta et al. ................... 340/531 |
| 2005/0259618 A1 * | 11/2005 | Ahya et al. .................... 370/331 |
| 2006/0039389 A1 * | 2/2006 | Burger et al. .................. 370/401 |
| 2006/0041590 A1 * | 2/2006 | King et al. ................... 707/104.1 |
| 2006/0282877 A1 * | 12/2006 | Goh et al. .......................... 726/1 |
| 2007/0070038 A1 * | 3/2007 | Hoffberg et al. ............... 345/156 |
| 2007/0143397 A1 * | 6/2007 | Guedalia et al. .............. 709/203 |
| 2007/0178891 A1 * | 8/2007 | Louch et al. ................... 455/420 |
| 2009/0012878 A1 * | 1/2009 | Tedesco et al. ................. 705/27 |
| 2009/0046841 A1 * | 2/2009 | Hodge .......................... 379/189 |

* cited by examiner

*Primary Examiner* — Albert Wong
*Assistant Examiner* — Rufus Point
(74) *Attorney, Agent, or Firm* — The Farrell Law Firm, P.C.

(57) ABSTRACT

Provided is a remote mobile device access and control method, and particularly a generic approach for providing remote mobile device access and control. To this end, there is provided a method for a user to access and control his/her mobile device at a remote location by using a remote mobile device access and control architecture that allows the user to access an application and data of his/her mobile device.

7 Claims, 8 Drawing Sheets

METHOD FOR PROVIDING REMOTE MOBILE DEVICE ACCESS AND CONTROL

PRIORITY

This application claims priority under 35 U.S.C. §119(a) to an application entitled "Method for Providing Remote Mobile Device Access and Control" filed in the India Patent Office on May 31, 2006 and in the Korean Intellectual Property Office May 16, 2007 and assigned India Serial No. 936/CHE/2006 and Korea Serial No. 2007-47797, respectively, the contents of which are hereby incorporated by reference.

BACKGROUND OF THE INVENTION

1. Field of the Invention

The present invention relates to remote mobile device access and control, and more particularly to a method for providing remote mobile device access and control.

2. Description of the Related Art

In general, a mobile device access and control approach refers to a method by which a user accesses and controls a mobile device. In such a method, a user can access and control a mobile device through a human interface.

The approach for accessing and controlling a mobile device through a human interface requires the following components:
1. User
2. Mobile device
   1) Mobile application
   2) Mobile data
3. Human interface
   1) Hand interface
   2) Speech interface In order for a user to access and control a mobile device, a physical proximity between a user and a mobile device and a human interface is mandatory. This physical proximity enables a user to interact with an application and data. A user can access and control a mobile device and an application/data stored therein by using a human interface.

Such a human interface is a base for a mobile device access and control approach, is a base for interaction between a user and a mobile device, is located between a user and a mobile device, and enables a user to use a mobile device and an application/data.

Reference will now be made to an operation in which a user accesses and controls a mobile device by using a human interface, with reference to FIG. 1.

Figure 1:
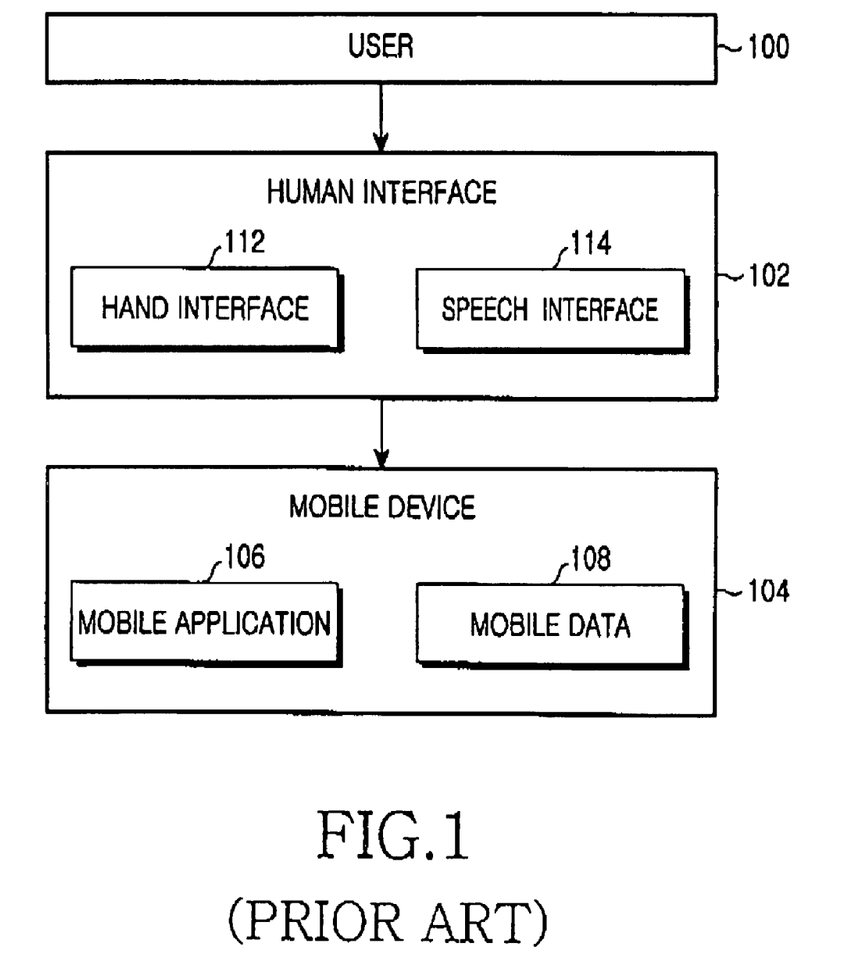
FIG. 1 is a view illustrating mobile device access and control

Referring to FIG. 1, components for allowing a user to access and control a mobile device include a user component 100, a human interface component 102, and a mobile device component 104.

First, the user component 100 is a component of mobile device access and control, and interacts with the human interface component 104.

The user component 100 uses one of human interface component 102 types including a hand interface 112 and a speech interface 114.

Further, the human interface component 102 is a component of mobile device access and control, and interacts with the mobile device component 104. The human interface component 102 uses one of mobile device component 104 types including a mobile application 106 and mobile data 108.

Further, the mobile device component 104 is a component of mobile device access and control, and interacts with the human interface component 102. The mobile device component 104 uses one of the human interface component 102 types including a hand interface 112 and a speech interface 114.

Hereinafter, the operation in which a user access and controls a mobile device will be discussed in detail.

In order to access and control a mobile device, a user 100 must be in physical proximity to a human interface 102 and the mobile device 104. Thus, when the user 100 intends to use his/her mobile device 104, he/she must be in physical proximity to the human interface 102 and his/her mobile device 104. If the user 100 is not in physical proximity to the human interface 102 and his/her mobile device 104, the user 100 cannot access and control his/her mobile device 104 without the human interface 102, despite that the human interface 102 is not in physical proximity to the user 100.

As stated above, the user 100 must be in physical proximity to the human interface 102 and the mobile device 104 in order to access and control the mobile device 104. For example, when the user 100 intends to make a call or transmit an SMS message by using the mobile device 104, he/she must be located in proximity to the human interface 102 and the mobile device 104. That is, if the user 100 does not carry the mobile device 104, he/she cannot access and control an application or data of the mobile device 104.

SUMMARY OF THE INVENTION

Accordingly, the present invention has been made to solve at least the above-mentioned problems occurring in the prior art, and the present invention provides a method for enabling a user to remotely access and control a mobile device.

Further, the present invention provides a method for enabling a user to remotely access and control a mobile device by using speech recognition technology.

Further, the present invention provides a remote mobile device access and control method that that allows local and remote mobile device access simultaneously.

In accordance with an aspect of the present invention, there is provided a method for accessing and controlling a remote mobile device, which has at least one application or data, by using a terminal, the method including transmitting a request for establishing a communication link from the terminal to the remote mobile device by using a preset password, and establishing the communication link at the request of the terminal by the remote mobile device when the request for establishing the communication link is made using the preset password; if the communication link is established, starting a finite state manager, and transmitting a control command for controlling the application or data of the remote mobile device by using a speech recognition or TTS (Text-To-Speech) function to the remote mobile device by the terminal; and accessing the application or data, and executing a corresponding command according to the control command from the terminal by the remote mobile device.

A mobile device user establishes a communication link with his/her remote mobile device by using any other mobile device or landline phone. A remote mobile device access and control architecture includes an authentication layer for allowing only an authorized mobile device user to establish a communication link with his/her mobile device at a remote location from any other mobile device or landline phone based on missed call count as a password and a DTMF (Dual Tone Multiple Frequency) password. The mobile device access and control architecture includes remote engine start which makes it possible to start a remote finite state manager once authentication is successful and does all initializations required to bring up the mobile device access and control architecture. The mobile device access and control architecture includes remote finite state manager start which brings up the remote finite state manager and maps the mobile device as a finite state machine that is controlled by the remote finite state manager and has a state event queue which receives a state event and a process state event at a given time when the mobile device will be in any one of the state as state idle, state instruction, state command or state end. The remote finite state manager provides a speech interface and a DTMF key input for the mobile device user to interact with his remote mobile device. State Idle is the default state of the remote finite state manager where there will be no pending event in the state event queue. State Instruction is the instruction state of the remote finite state manager where the remote finite state manager reads a predefined remote XML (eXtensible Markup Language) instruction file. State Command is the command state of the remote finite state manager where the finite state manager reads a remote XML command file. State End is the end state of the remote finite state manager where the remote finite state manager will end the remote finite state manager.

Accordingly, this invention discloses a method for providing remote device access and control, including any other device user accessing his/her device at a remote location using remote other device access and control architecture which allows the other device user to access his/her device application and data.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE EXEMPLARY EMBODIMENT

Hereinafter, exemplary embodiments of the present invention will be described with reference to the accompanying drawings. It should be noted that the similar components are designated by similar reference numerals although they are illustrated in different drawings. Also, in the following description, a detailed description of known functions and configurations incorporated herein will be omitted when it may obscure the subject matter of the present invention. Further, it should be noted that only parts essential for understanding the operations according to the present invention will be described and a description of parts other than the essential parts will be omitted in order not to obscure the gist of the present invention.

The present invention provides a way for a user to access and control his/her mobile device at a remote location by using a remote mobile device access and control architecture that allows the user to access an application and data of his/her mobile device.

Figure 2:
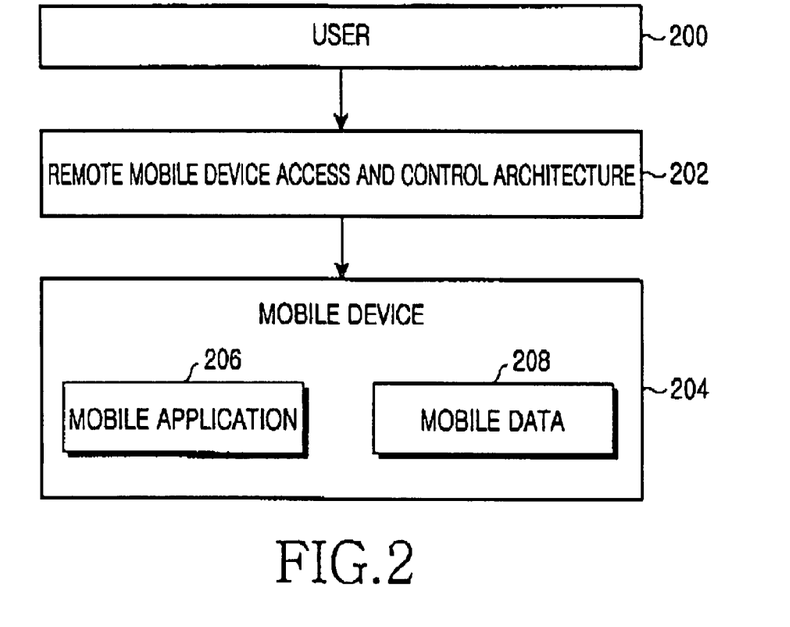
FIG. 2 is a view illustrating remote mobile device and access control in accordance with the present invention.

The present invention provides an approach to remove limitations in a conventional mobile device access and control. Reference will now be made to FIG. 2 which illustrates a remote mobile device access and control operation according to the present invention.

Remote mobile device access and control
(1) User 200
Allows the user 200 to remotely access and control the mobile device 204.
(2) Remote mobile device access and control architecture 202
Allows the user 200 to access the mobile device without a physical interface between the user 200 and the mobile device 204.
(3) Mobile device 204
Includes a mobile application 206 and a mobile data 208.

Figure 3:
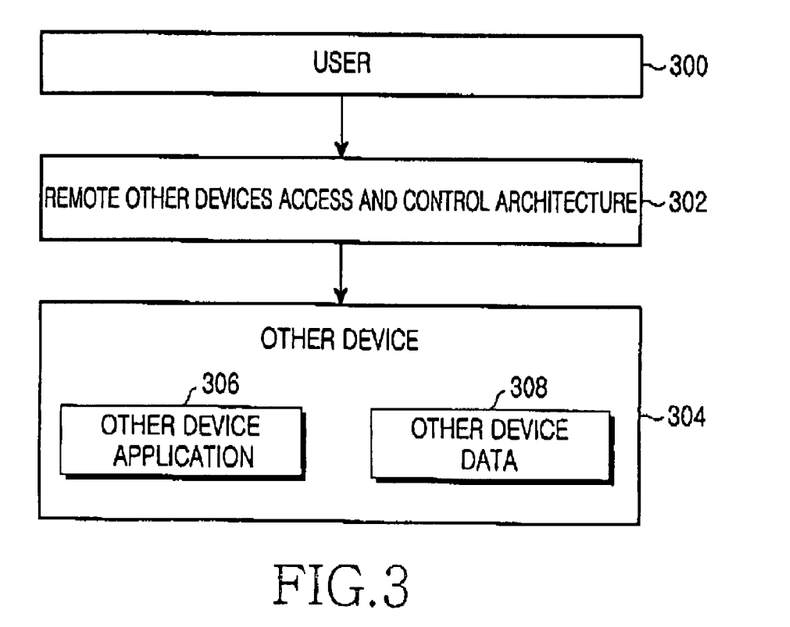
FIG. 3 is a view illustrating another remote device access and control.

Further, the present invention provides an approach to remove limitations in other conventional device access and control. Reference will now be made to FIG. 3 which illustrates an operation for an other device access and control operation according to the present invention.

Remote other device access and control
(1) User 300
Allows the user 300 to remotely access an other device 304.
(2) Remote other device access and control architecture 302
Allows the user 300 to access the other device 304 without a physical interface between the user 300 and the other device 304.
(3) Other device 304
Includes an other device application 306 and other device data 308.

The primary object of this invention is to remove limitations in mobile device access and control, but the present invention can be applied in other devices so as to overcome similar limitations. FIGS. 4A to 4F present an inventive structure for remote mobile device access and control. The inventive system for remote mobile device access and control includes a user 200, a remote mobile device access and control architecture 202, and a mobile device 204. This system for remote mobile device access and control allows the user 200 to remotely access the mobile device 204, based on platform support for the remote mobile device access and control architecture 202.

If there is platform support for the remote mobile device access and control architecture 202, then the user 200 can remotely access the mobile device 204.

If there is no platform support for the remote mobile device access and control architecture 202, then the user 200 cannot remotely access the mobile device 204.

In the present invention, a speech interface and a Dual Tone Multiple Frequency (DTMF) interface may be used as the remote mobile device access and control architecture 202 for providing remote interaction between the user 200 and the mobile device 204.

Further, the remote mobile device access and control architecture 202 includes an authentication layer, a remote mobile device access and control architecture layer, and a mobile device layer.

With regard to this, the authentication layer assures that only an authorized user 200 obtains access remotely to the mobile device 204, the remote mobile device access and control architecture layer assures interaction between the user 200 and the mobile device 204, and the mobile device layer assures access to a mobile application 206 and a mobile data 208.

Reference will now be made to an operation in which a user 200 remotely accesses and controls a mobile device 204 or any other device 304 according to the present invention, with reference to FIGS. 4A to 4F.

First, the operation for remote mobile device access and control will be described in detail with reference to the drawings.

Figure 4A:
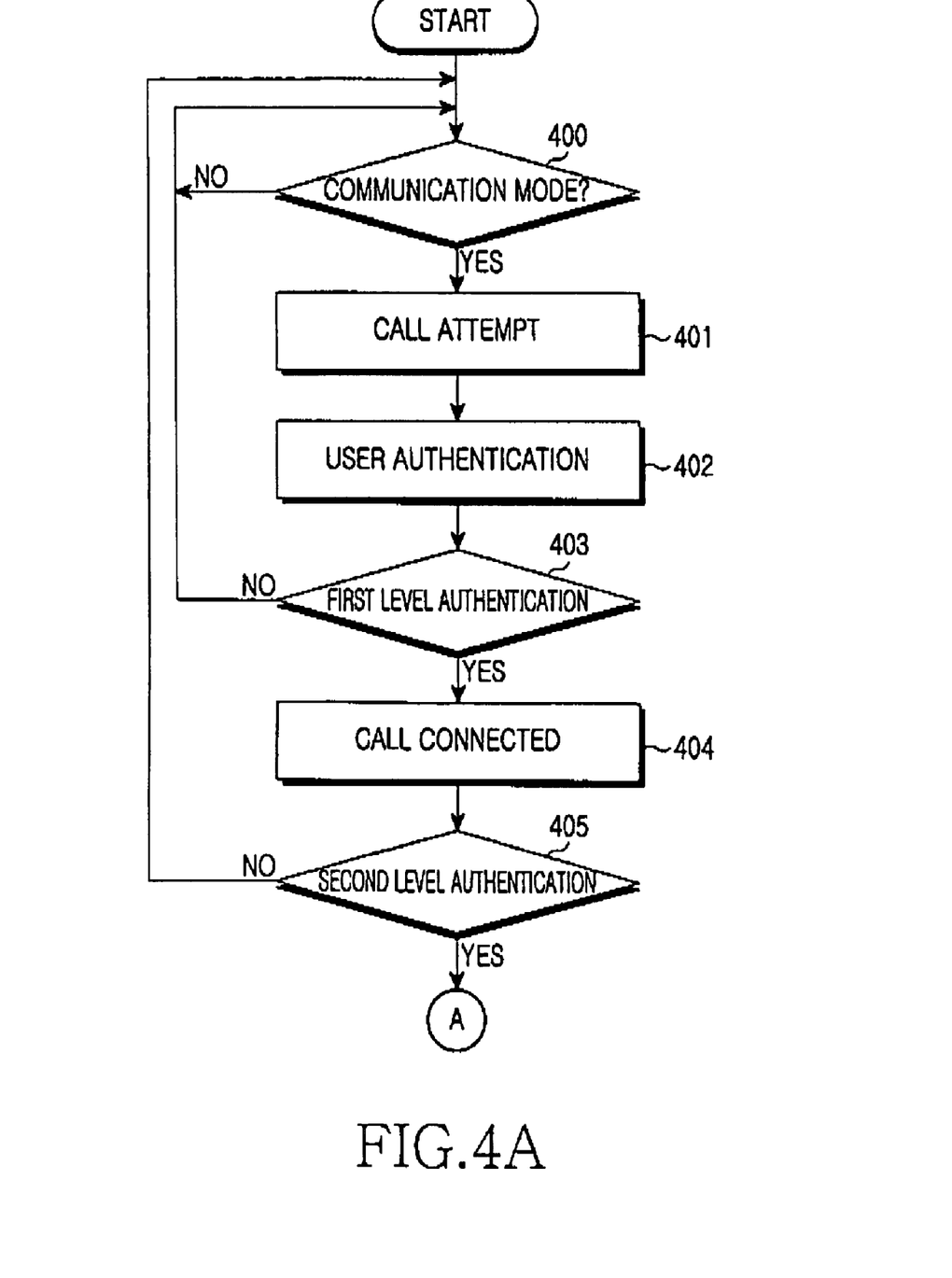
FIGS. 4A to 4F are flowcharts illustrating a procedure of accessing and controlling a remote mobile device in accordance with the present invention.

In steps 400 and 401, when a user 200 wants to remotely access a target mobile device 204, he/she makes a call to the target mobile device 204 by using a mobile device or a landline phone. In the following description, it will be assumed by way of example that the user 200 intends to control any other mobile device by using his/her mobile terminal.

In step 402, a user authentication procedure is performed. In the present invention, the authentication layer performs first-level authentication and second-level authentication.

First, the first-level authentication can be achieved by using a missed call count as a password. That is, the user 200 can set a missed call count in continuation from the same number as a password on the target mobile device 204. For example, the user 200 can set four missed call count from a same number in continuation as a password.

If the user 200 succeeds in the first-level authentication in step 403, then a call is connected between the target mobile device 204 and the user's mobile terminal in step 404. However, if the user 200 fails in the first-level authentication, then a call is not connected between the target mobile device 204 and the user's mobile terminal.

If the user 200 proceeds to step 405 in a state where the call is connected in step 404, the second-level authentication is performed. The second-level authentication may be achieved in such a manner that the user 200 sets a password in advance by using DTMF, and passes authentication when the set password is input. For example, the user 200 may set DTMF "1234" as a password. Then, the user 200 can input the password for acquiring the second-level authentication on his/her mobile terminal by means of DTMF.

If the user 200 succeeds in the second-level authentication in step 405, the user's mobile terminal obtains access to the remote mobile device access and control architecture layer. However, if the user 200 fails in the second-level authentication, the call between the user's mobile terminal and the target mobile device 204 is terminated. If the call connection is maintained, the user's mobile terminal proceeds to step 406 in FIG. 4B, and starts a remote engine in the remote mobile device access and control architecture layer. Next, in step 407, the user's mobile terminal starts a remote finite state manager. Subsequently, in step 408, the user's terminal checks a remote finite state manager state.

Figure 4B:
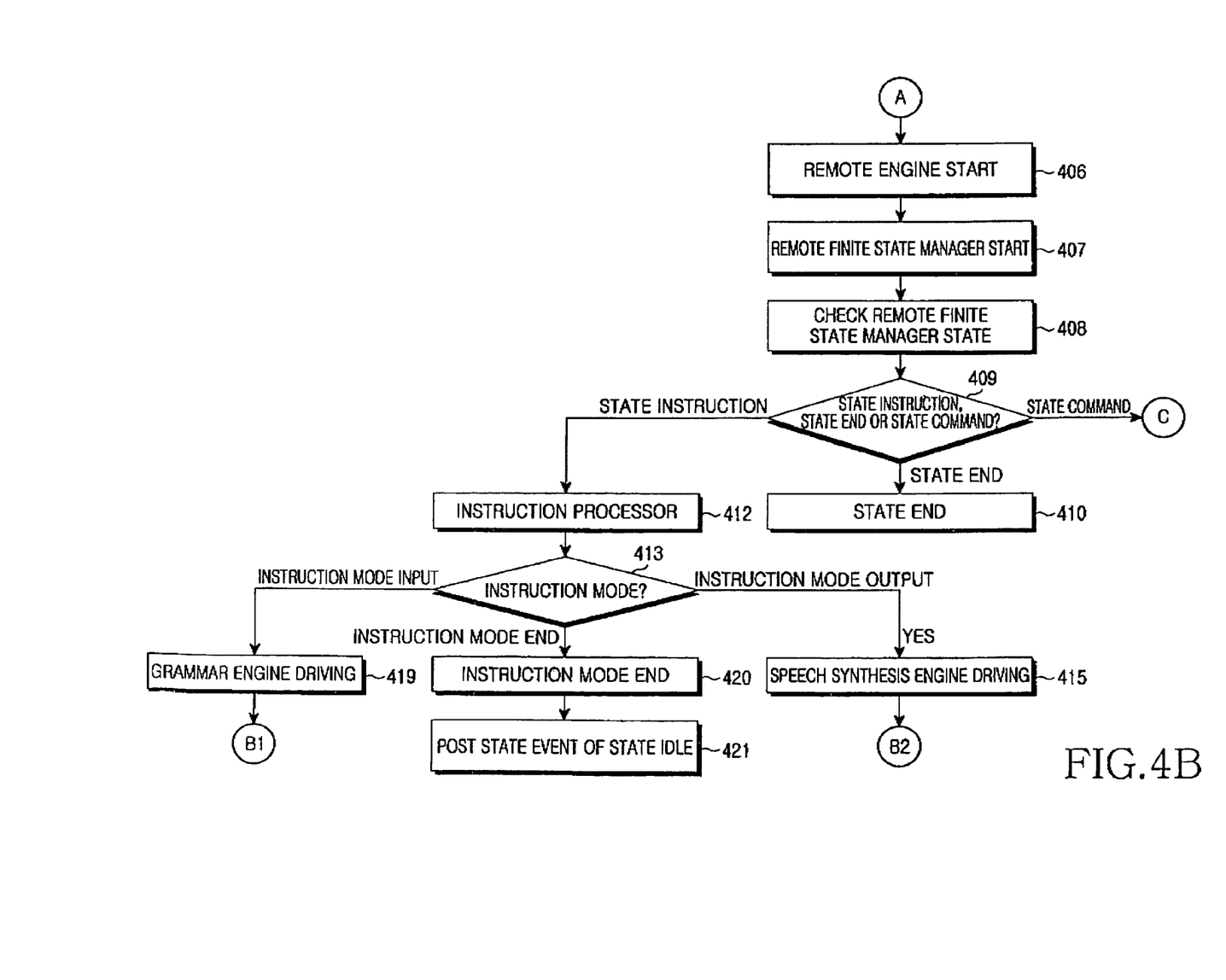

Here, the remote finite state manager state includes State Idle, State Instruction, State Command and State End, and the remote finite state manager manages a state event queue.

Further, the remote finite state manager changes its state based on a state event in the state event queue. At first, the remote finite state manager state lies in State Idle as a default state.

When there is a state idle event in the state event queue managed by the remote finite state manager, the remote finite state manager state is changed to State Idle.

Further, the remote finite state manager keeps scanning the state event queue for a state event. When there is a state instruction event in the state event queue managed by the remote finite state manager, the remote finite state manager state is changed to State Instruction.

In step 409, the remote finite state manager checks whether a state event in the state event queue is State Instruction, State End, or State Command.

If the state event in the state event queue corresponds to State Instruction, the remote finite state manager proceeds to step 412, and processes an instruction. However, if a result of the check in step 409 shows that the state event in the state event queue is State End, the remote finite state manager proceeds to step 410, and ends the remote engine. That is, when there is a state end event in the state event queue managed by the remote finite state manager, the remote finite state manager state is changed to State End.

Further, in step 412, an instruction processor reads a predefined remote eXtensible Markup Language (XML) instruction file by using a remote XML parser.

Figure 4C:
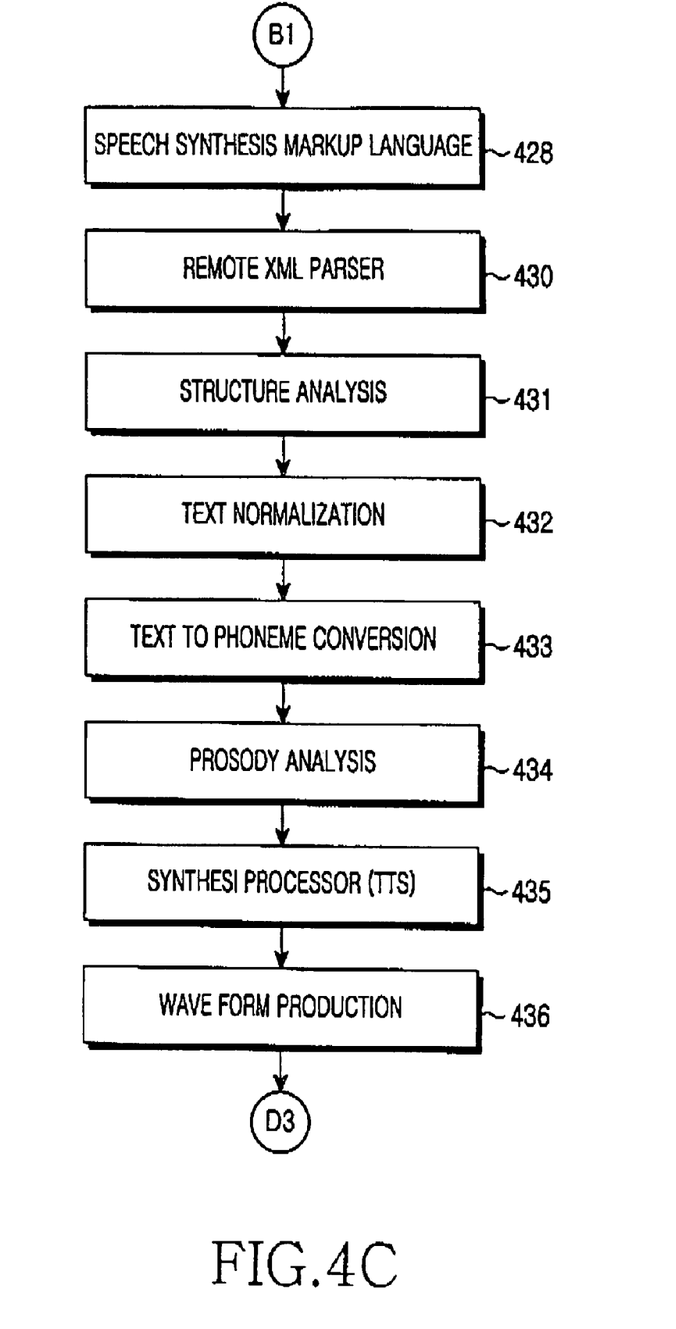
Figure 4D:
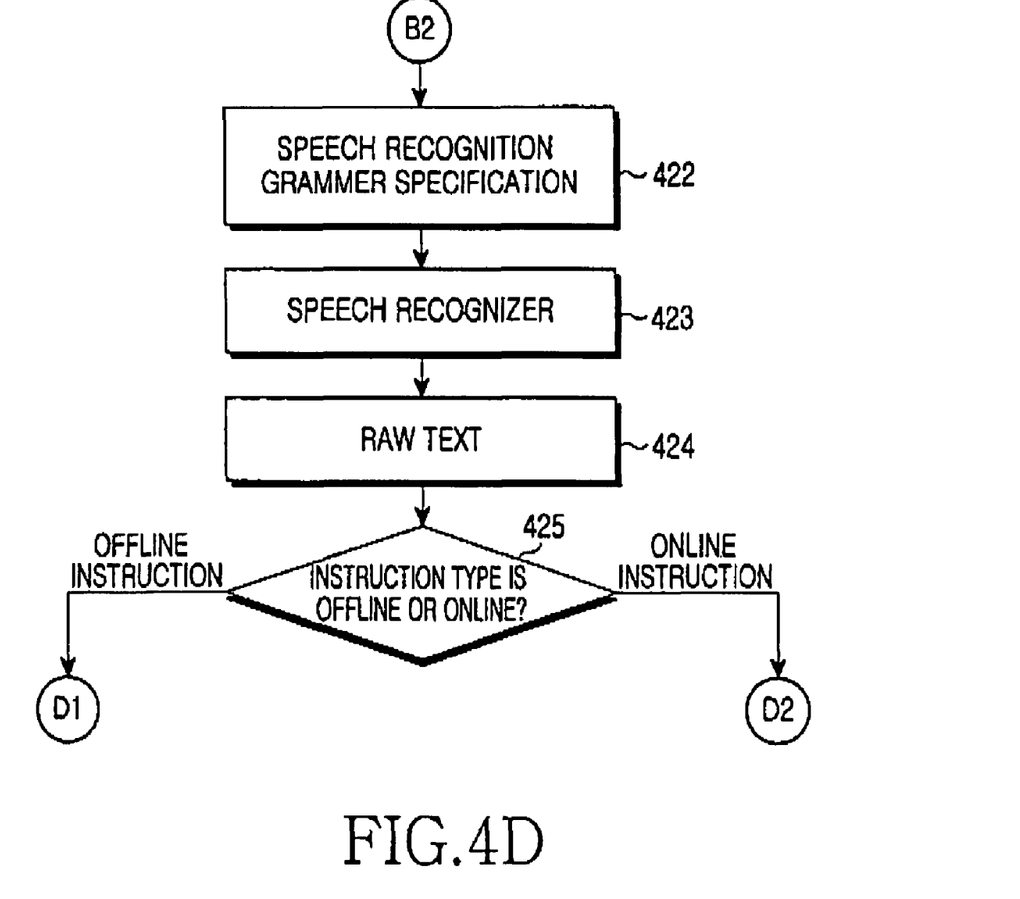

In step 413, the instruction processor checks if there is an instruction mode input or an instruction mode output. If there is an instruction mode input, the instruction processor proceeds to step 419, and provides the instruction mode input to a grammar engine. Subsequent steps will be described with reference to FIG. 4C. Referring to FIG. 4C, the instruction processor proceeds from step 419 to step 428. A speech synthesis markup language (instruction) in step 428 is input to the grammar engine for parsing in step 430. If the instruction processor proceeds from step 419 to step 428, the grammar engine performs remote XML parsing for the instruction. Subsequently, the grammar engine performs structure analysis in step 431, text normalization in step 432, and text-to-phoneme conversion in step 433, form production and speech as a predefined instruction in step 436.

In contrast with this, if there is an instruction mode output in step 413, the instruction mode output is given to a speech synthesis engine.

In step 425, the speech synthesis engine checks whether the instruction type is offline or online. The speech synthesis engine proceeds to D1 if the instruction type is offline, and proceeds to D2 if the instruction is online. Steps following D1 and D2 will be described with reference to FIG. 4E.

Figure 4E:
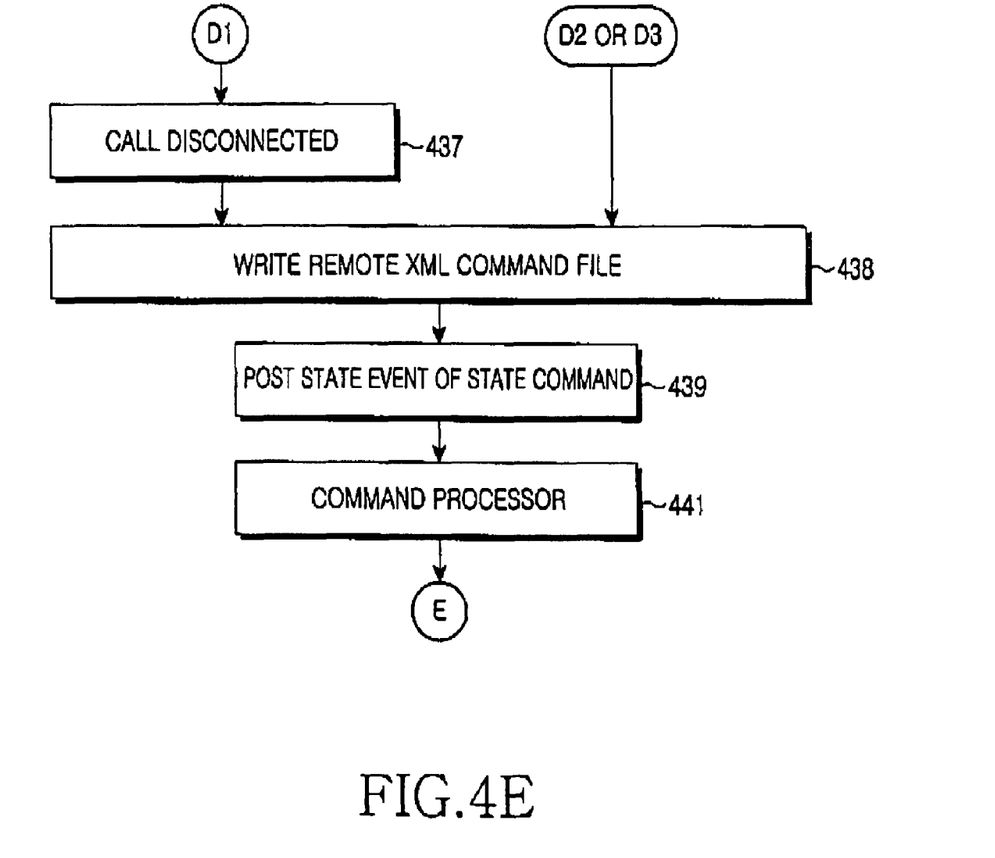

Referring to FIG. 4E, if the instruction type is offline, the speech synthesis engine proceeds to step 437 in which the call is disconnected, and then proceeds to step 438. In step 438 to which step 437, D2 and D3 are transferred respectively, the speech synthesis engine writes the instruction into a remote XML command file. Subsequently, in step 439, the state event becomes a post state event of State Command, and the remote finite state manager state is changed to State Command. That is, when there is a state command event in the state event queue managed by the remote finite state manager, the remote finite state manager state is changed to State Command. Then, in step 441, a command processor is driven, and the command processor proceeds to E. Steps following E will be described with reference to FIG. 4F.

Figure 4F:
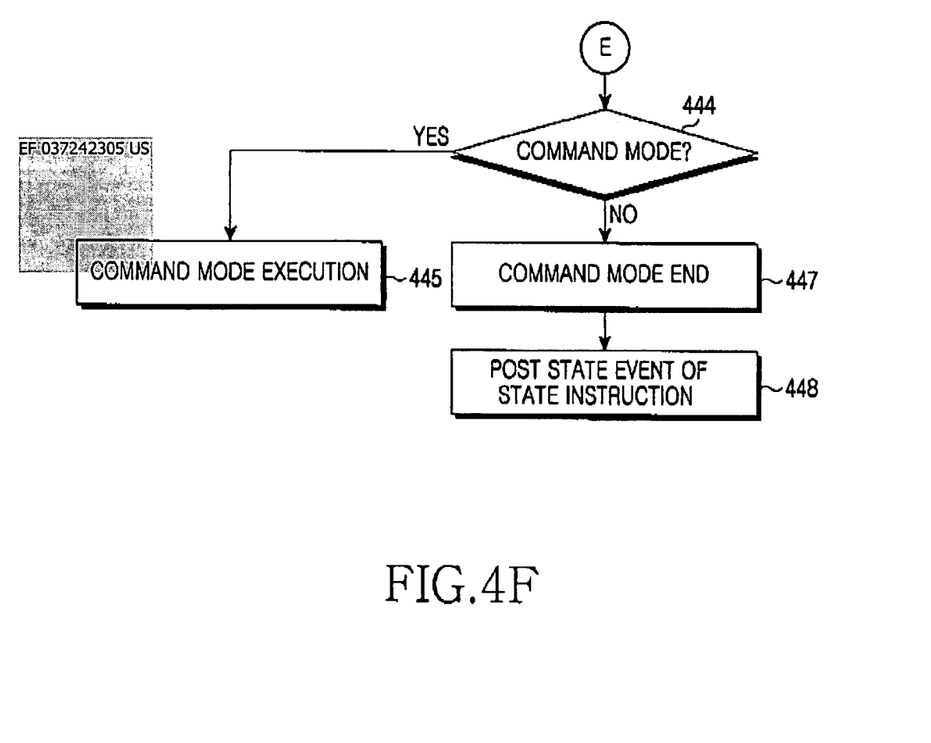

Referring to FIG. 4F, the command processor checks in step 444 if there is a command mode. If there is a command mode, the command processor proceeds to step 445, and reads the remote XML command file by using the remote XML parser. Based on the command mode, the command processor executes a command read for a mobile device application or mobile device data.

However, if there is no command mode in step 444, the command processor proceeds to step 447, and ends the command mode.

The state event becomes a command mode end post state event of State Instruction, and the remote finite manager state is changed to State Instruction.

In FIGS. 4A to 4F, a description has been given of a procedure in which a user 200 remotely accesses a target mobile device 204 through a wireless/wired network and controls an application or data of the target mobile device by using a speech recognition or TTS function of a mobile terminal or landline phone carried with him/her. Further, it is possible for the user 300 to remotely access and control a device 304 other than a mobile device through the procedure as described in FIGS. 4A to 4F.

As described above, the inventive method can lead to the development of a new standard markup language. Further, the user 200 can remotely access a target mobile device 204 through a wireless/wired network and control an application 206 or data 208 of the target mobile device by using a speech recognition or TTS function of a mobile terminal or landline phone carried with him/her.

It will also be clear to those skilled in the art that other control methods and apparatuses can be derived from the combinations of the various methods and apparatuses of the present invention as taught by the description and the accompanying drawings and these shall also be considered within the scope of the present invention. Further, description of such combinations and variations is therefore omitted above. It should also be noted that the host for storing the applications include but not limited to a microchip, microprocessor, handheld communication device, computer, rendering device or a multi function device.

Although the present invention has been fully described in connection with the preferred embodiments thereof with reference to the accompanying drawings, it is to be noted that various changes and modifications are possible and are apparent to those skilled in the art. Such changes and modifications are to be understood as included within the scope of the present invention as defined by the appended claims unless they depart there from.

What is claimed is:

1. A method for accessing and controlling a remote mobile device, which has at least one of an application or a data, by using a terminal, the method comprising:
receiving a request for establishing a call connection between the terminal and the remote mobile device, authenticating the terminal by the remote mobile device by using a first preset password, and establishing the call connection with the terminal at the request of the terminal by the remote mobile device if the request for establishing the call connection is made using the first preset password;
if the call connection is established, performing authentication at least once more by using a second preset password;
if the second password is input from the terminal, starting a finite state manager, and receiving a control command for controlling the application or data of the remote mobile device by using a speech recognition or TTS (Text-To-Speech) function from the terminal; and
accessing the application or data, and executing a corresponding command according to the control command from the terminal by the remote mobile device,
wherein the first preset password comprises a missed call count, and
wherein the second preset password comprises a Dual Tone Multiple Frequency (DTMF) password.

2. The method as claimed in claim 1, further comprising scanning a state event queue indicative of a remote mobile device state by a remote finite state manager of the terminal, wherein the remote mobile device state includes a State Idle, a State Instruction, a State Command, and a State End.

3. The method as claimed in claim 2, wherein the State Idle is a default state of the remote finite state manager where there is no pending event in the state event queue.

4. The method as claimed in claim 2, wherein the State Instruction is an instruction state of the remote finite state manager where the remote finite state manager reads a predefined remote eXtensible Markup Language (XML) instruction file.

5. The method as claimed in claim 2, wherein the State Command is a command state of the remote finite state manager where the finite state manager reads a remote XML command file.

6. The method as claimed in claim 2, wherein the State End is an end state of the remote finite state manager where the remote finite state manager ends the remote finite state manager.

7. The method as claimed in claim 1, further comprising:
checking whether a type of the control command is offline or online;
if the type of the control command is offline, disconnecting the call connection.

* * * * *